Sept. 12, 1933.                    A. J. METZ                    1,926,550
VEHICLE AXLE AND HUB
Filed Nov. 5, 1932
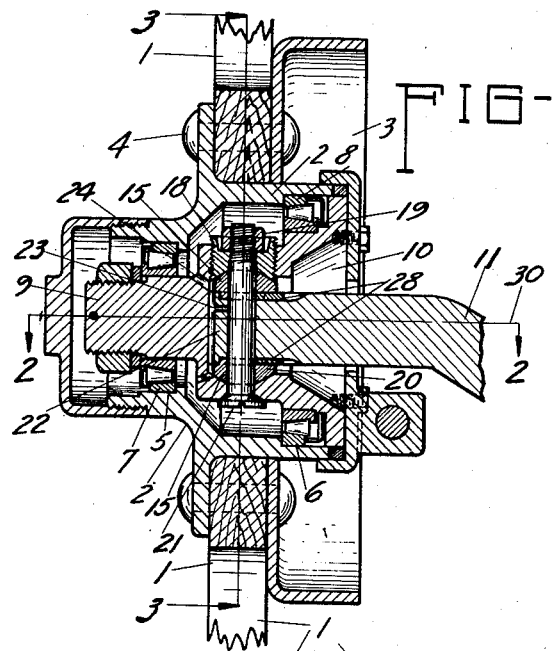
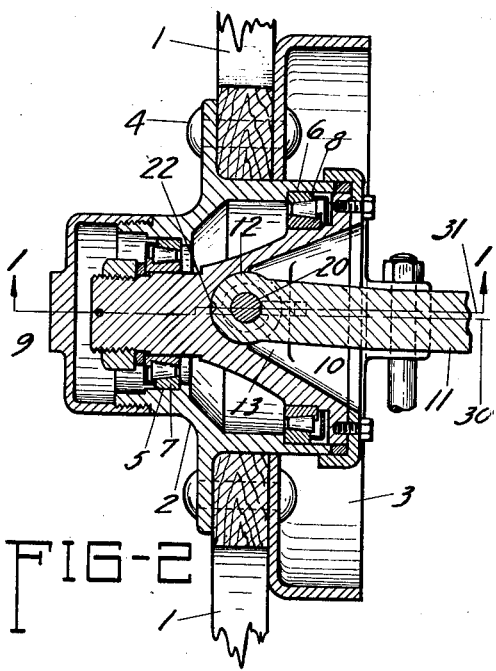
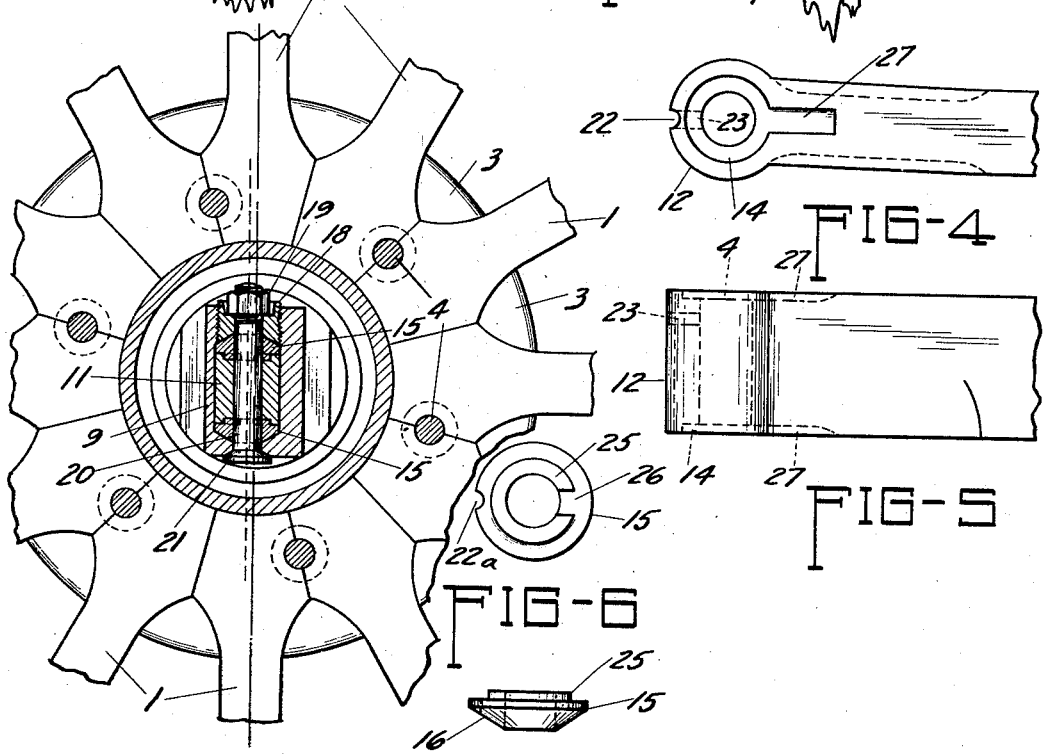
A. J. METZ   INVENTOR
BY
Merrill M. Blackburn
ATTORNEY Patented Sept. 12, 1933

1,926,550

UNITED STATES PATENT OFFICE 1,926,550

VEHICLE AXLE AND HUB

Anthony J. Metz, Davenport, Iowa, assignor of one-third to J. R. Porter and one-third to R. C. Jones, both of Davenport, Iowa Application November 5, 1932. Serial No. 641,361

6 Claims. (Cl. 280—96.3)

The present invention relates to the construction of a vehicle axle and hub and more especially to such construction as is concerned with the turning of the wheel in the act of steering the vehicle and in normally keeping the vehicle running straight ahead. Among the objects of this invention are to so construct a mechanism of the character indicated as to eliminate the necessity for toe-in; to so construct a mechanism of the character indicated as to provide natural caster for the wheels; to provide a mechanism of the character indicated in which the tendency to shimmy is eliminated; to provide a construction of the character indicated which will eliminate wheel-fight and tromp; and such further objects, advantages and capabilities as will hereafter appear and as are inherent in the construction disclosed herein. My invention further resides in the combination, construction and arrangement of parts illustrated in the accompanying drawing and, while I have shown therein what is now considered the preferred embodiment of this invention, I desire the same to be understood as illustrative only and not to be interpreted in a limiting sense.

The present invention is in the nature of an improvement upon the structure disclosed in my application Serial No. 592,273, filed February 11, 1932, and is concerned more particularly with the pivotal connection between the wheel spindle and the end of the axle.

In the drawing annexed hereto and forming a part hereof,

Fig. 1 is a fragmentary vertical section substantially along the plane indicated by the broken line 1—1, Fig. 2;

Fig. 2 is a horizontal section substantially along the plane indicated by the line 2—2, Fig. 1;

Fig. 3 is a transverse section approximately along the plane indicated by the line 3—3, Fig. 1;

Fig. 4 is a plan view of the end of an axle constructed in accordance with my present invention;

Fig. 5 is an elevation of the structure shown in Fig. 4;

Fig. 6 is a plan view and Fig. 7 an edge view of a bearing member used in connecting the spindle and axle.

Reference will now be made in greater detail to the annexed drawing for a more complete description of my present invention. In the drawing, the spokes are denoted by the numeral 1, the hub by the numeral 2 and the brake drum by the numeral 3. These parts are secured together by suitable means 4, such as rivets, as is quite common in the art. Suitable bearing seats 5 and 6 are provided inside the hub for the bearing rings 7 and 8 which constitute parts of the hub bearings for the wheel. These bearings might be ball bearings but I have chosen to illustrate cone bearings because I believe them preferable. Inasmuch as such bearings are standard and can be purchased by anyone desiring same, I shall not go into a detailed explanation thereof.

In Fig. 2 it will be noted that the inner end of the spindle 9 is hollowed out as indicated at 10 for reception of the end of the axle 11. The extreme end of the axle is finished with a cylindrical surface, as indicated at 12, and this cooperates with a similar surface at the outer end of the extension 13 of opening 10. This arrangement furnishes a lateral thrust bearing between the axle and spindle so as to reduce to a minimum the stress upon the vertical turning axle upon which the wheel turns when the vehicle is being steered.

The outer portion of the opening 10 is frusto-conical in shape, as indicated in Figs. 1 and 2, and has an extension 13 which is flattened in a vertical direction for reception of the extreme end of the axle. Sockets 14 are formed in opposite sides of the axle 11 for the reception of bearing members 15, serving as an axle about which the wheel spindle turns when the vehicle is steered. The bearing faces of these bearing members 15 are frusto-conical instead of being segments of a sphere, as in my prior construction. It has been found in extended driving that, with the spherical bearing surfaces, there was a slight tendency to creep under certain conditions and an attempt was therefore made to find a way to overcome this. While the tendency referred to would not be noticed by the average driver, it might be noticed by the very experienced driver and it was therefore deemed advisable to find a way to obviate the same. This resulted in the discovery that frusto-conical bearing members substituted for those having a spherical surface would accomplish the desired result.

A socket is formed in the lower face of the extension of opening 10, the same corresponding in shape to the frusto-conical face 16 of the bearing member 15. A similar socket is formed in the inner face of the plug 18 for the reception of the frusto-conical face 16 of the other bearing member 15. It will be apparent that the plug 18 can be adjusted inwardly or outwardly until the proper degree of tightness is secured between the bearing members and the spindle. While various methods of securing the plug 18 in place may be employed, I prefer to use a lock-nut 19 which is tightened up against the end of the plug 18, as will be obvious from Figs. 1 and 3. A bolt 20 having a head 21 passes through the spindle 9, bearing members 15, end of axle 11, and plug 18. The head 21 of the bolt 20 is drawn up tightly against its seat in the lower face of the spindle 9 and it will therefore be apparent that if there is any flexing of the lower part of the spindle during operation of the machine, by virtue of pressure of the axle being transmitted thereto through the bearing member 15, the force will also be transmitted through the bolt 20, nut 19, and plug 18 to the upper part of the spindle, thereby dividing the stress and distributing same more evenly through the spindle. A groove 22 is formed in the extreme end of the axle and serves to carry lubrication down between the axle and spindle so that the bearing faces will be properly lubricated. From the groove 22 extends a port 23 which reaches the transverse aperture through which the bolt 20 is passed. This permits the lubricant to pass from the groove 22 to the surface of the bolt 20, thereby lubricating this bearing between the bolt and axle and preventing undue wear at this point. The upper end of the groove 22 terminates at the lower end of the plug 18. Therefore, lubricant will be furnished to the upper bearing member 15. From Fig. 6 it will be apparent that the groove 22 is extended at 22a through the edge of bearing member 15, so that lubricant can reach the bearing face thereof. An oil hole 24, through a part of the spindle, serves to carry the lubricant to the groove 22, while a similar hole at the lower end of the groove 22 carries off the excess of oil and permits same to escape into the interior of the hub.

A flange 25 is formed on the flat face of member 15 and, in use, is seated in the depression 14 in the end of the axle. As indicated heretofore, the extension 22a of groove 22 is in alignment therewith. Opposite this is a notch 26 in the flange 25. This is placed in alignment with the groove 27 in the axle and a key 28 is driven in to lock the bearing member 15 against rotation relatively to the axle.

While I have disclosed in my prior application referred to above the relationship of the axes of the axle and spindle and of the turning axis of the spindle with relation to the axle, I shall now refer to same briefly. The line 30 indicates the axis of the spindle about which the wheel turns, while the line 31 indicates the axis of the axle which passes through the axis of the bolt 20, about which the wheel turns when the vehicle is being steered. It will be apparent from an examination of Fig. 1 that the longitudinal axis of the axle is below the line 30. From Fig. 2 it will be be seen that the longitudinal axis 31 of the axle is ahead of the longitudinal axis 30 of the spindle. The purpose of the latter is to render it unnecessary to provide the customary caster. This results from placing the vertical center line of the wheel to the rear of the turning axis of the spindle, thereby, in effect, securing a caster effect. Placing the longitudinal axis of the axle below the axis of the spindle tends to cause the car to hold to the ground more closely.

It will of course be understood that the specific disclosure herein set forth may be departed from without departing from the spirit of my invention as set forth in the appended claims.

Having now described my invention, I claim:

1. An axle assembly comprising, in combination, a spindle upon which a wheel is mounted to rotate, said spindle having a hollow end for the reception of an axle, an axle having its end inserted in the hollow of the spindle and connected thereto, pivotally, so that the spindle may oscillate in a horizontal direction, the spindle having an opening extending transversely thereof and intersecting centrally, in a front and rear direction, the hollow of the spindle, there being a frusto-conical seat hollowed out around the lower end of said opening, a plug inserted in the upper end of said opening, said plug having a central opening for the reception of a pivot bolt, said plug having in its inner face a frusto-conical seat surrounding said central opening, the axle having at its end, in its upper and lower faces, sockets for the reception of pivot members, pivot members mounted in said sockets and fitting in said frusto-conical seats, and a bolt extending through the spindle opening, the pivot members, the axle, and the plug to hold the parts in adjusted position and furnish means about which the axle and spindle may turn, relatively.

2. In a structure of the character indicated, the combination of an axle and a spindle connected for relative oscillation in a substantially horizontal plane, a pivot bolt connecting the two, the pivot bolt being located in the medial plane of a wheel mounted on the spindle, the end of the axle being inserted into the spindle and having an opening therethrough for the reception of the pivot bolt, about which it oscillates, sockets in the end of the axle, bearing members non-rotatably mounted in said sockets, said bearing members having frusto-conical bearing faces, the spindle having internal bearing sockets of the same shape as the bearing faces of the bearing members, the pivot bolt passing through the spindle, bearing members, and axle and holding these parts in adjusted position.

3. A structure as defined by claim 2 in which the longitudinal axis of the spindle is located rearwardly of the turning axis of the spindle about the bolt.

4. A structure as defined by claim 2 in which a part of the opening in the spindle through which the bolt passes is larger than the opening through the opposite side of the spindle and a plug is adjustably mounted in said larger portion and serves as means for adjusting the pressure upon the frusto-conical bearing surfaces surrounding the bolt.

5. A structure as defined by claim 2 having means for preventing rotary movement of the frusto-conical members with the spindle and with relation to the axle.

6. A structure as defined by claim 2 in which each of the bearing members has on its face opposite the frusto-conical face a substantially annular flange, which flange fits into the socket in the end of the axle.

ANTHONY J. METZ.